: 3,432,267
Patented Mar. 11, 1969

3,432,267
REGENERATION OF ANTHRAQUINONE WORKING SOLUTION USED IN THE PRODUCTION OF HYDROGEN PEROXIDE
Nathan Dean Lee, Lambertville, and Nelson Norman Schwartz, Trenton, N.J., assignors to FMC Corporation, New York, N.Y., a corporation of Delaware
No Drawing. Filed May 26, 1967, Ser. No. 641,458
U.S. Cl. 23—207       8 Claims
Int. Cl. C01b 15/02

ABSTRACT OF THE DISCLOSURE

A degraded anthraquinone working solution (made up of an anthraquinone working compound dissolved in one or more solvents) used in the production of hydrogen peroxide is regenerated by treating it with ozone, extracting the resulting solution with an aqueous caustic solution, separating the aqueous caustic extract from the remaining working solution and contacting said solution with either activated alumina or activated magnesia.

BACKGROUND OF THE INVENTION

Field of the invention

The invention relates to the regeneration of anthraquinone working solutions used in the maufacture of hydrogen peroxide.

Description of the prior art

It is known that anthraquinone compounds, e.g., 2-ethylanthraquinone, and their tetrahydro derivatives can be used as working compounds in a process for producing hydrogen peroxide. In this process, commonly known as the anthraquinone process, the working compound is dissolved in a suitable solvent, or solvent mixture, and is alternately reduced and oxidized. During the reducing stage, the working compound is hydrogenated in the presence of a catalyst to reduce it to its hydroquinone form. In the subsequent oxidation step the working compound is oxidized with air, oxygen or other oxygen containing gases to convert it to its quinone form with concomitant formation of hydrogen peroxide. The hydrogen peroxide product is then removed from the working solution, preferably by extraction with water, and the remaining working solution is recycled to the hydrogenator to again commence the cyclic process for producing hydrogen peroxide The detailed operation of this process is described fully in U.S. Patents Nos. 2,158,525 and 2,215,883.

During cyclic hydrogenation and oxidation of the working solution in the above process, and particularly during the catalytic hydrogenation step, the anthraquinone working compound is gradually converted to degradation products that are unable to produce hydrogen peroxide. The rate of formation of these degradation products increases as the temperature of the working solution being hydrogenated and oxidized is elevated. Additionally, as the proportion of the working compound which is hydrogenated per pass through the system (also termed "depth of hydrogenation") is increased, the amount of degradation products also rises sharply.

During the cyclic processing, these anthraquinone working compounds also undergo hydrogenation of other than the quinone groups during the catalytic hydrogenation step. This results in the gradual formation of corresponding tetrahydroanthraquinone derivatives of the working compound. These compounds, unlike the degradation products discussed above, will produce hydrogen peroxide upon cyclic reduction and oxidation in the same manner as the original anthraquinone working compound. Accordingly, the term "degradation products" as used herein does not apply to tetrahydro derivatives of the anthraquinone working compound.

In U.S. Patent 2,739,875, issued to Jerome W. Sprauer on Mar. 27, 1956, there is described a process for treating an anthraquinone working solution containing degradation products whereby the solution can be regenerated to restore its hydrogen peroxide synthesizing capacity. In accordance with this process, the anthraquinone working solution is heated in the presence of either activated alumina or activated magnesia, thereby regenerating its hydrogen peroxide synthesizing capacity.

While this process has been found to be useful and effective in regenerating some working solutions during initial use, after repeated cyclic hydrogenation and oxidation of an anthraquinone working solution, it develops a resistance to being regenerated by activated alumina or magnesia. This resistance is not believed due to loss of activity on the part of the activated alumina or activated magnesia, since replacement of these activated materials does not result in any substantial improvement in the degree of regeneration. While the reason for this resistance to regeneration is not understood, the result is most serious since expensive anthraquinone working compound must be replaced in the working solution in order to maintain the hydrogen peroxide output of the working solution at a satisfactory level.

As a result, there is a need for a method of regenerating the working solutions used in the anthraquinone processes whereby the effective peroxide synthesizing capacity of the solutions can be restored, even after repeated cyclic use of the working solution.

SUMMARY OF THE INVENTION

We have now found that a degraded anthraquinone working solution made up of an anthraquinone working compound dissolved in at least one solvent, and containing degradation products of said working compound produced during the alternate, cyclic hydrogenation and oxidation of the working solution to produce hydrogen peroxide, can be regenerated to increase its hydrogen peroxide producing capacity by contacting the working solution with an effective amount of ozone, extracting the ozone-treated working solution with an aqueous alkali metal hydroxide solution of 5–25% (preferably an aqueous solution of about 5 to 10% by weight of NaOH), separating the working solution from the extract, contacting said working solution with either activated alumina or activated magnesia, and recovering a regenerated working solution from said activated alumina or activated magnesia.

DESCRIPTION OF THE INVENTION AND THE PREFERRED EMBODIMENTS

In carrying out the present invention a conventional anthraquinone working solution which has been subjected to repeated cycles of catalytic hydrogenation and oxidation to produce hydrogen peroxide is used as the feed. The working solutions which can be used in the present invention are those that contain anthraquinone working compounds such as 2-ethylanthraquinone or the 2-isopropyl-, 2-sec-butyl-, 2,5-butyl-, 2-sec-amyl-, 2-methyl- or 1,3-dimethyl-derivatives of anthraquinone as well as other anthraquinones well known in the hydrogen peroxide art. These working compounds are dissolved in at least one solvent to form the anthraquinone working solutions; two or more mixed solvents may be used to enhance the solubility of an anthraquinone working compound in both its hydrogenated form, i.e., the hydroquinone form, and its oxidized form, i.e., the quinone form.

In accordance with the present process, the anthraquinone working solution which contains degradation products resulting from cyclic processing is first treated with ozone. During the ozonization stage the working solution is passed into a treating tank and the ozone is passed through the working solution. In a batch type treatment the ozonization may be carried out in a simple tower with candles at the base of the tower to permit the ozone gas to pass uniformly upwards through the working solution. More complex scrubbing units can also be used in order to promote better gas-liquid contact between the ozone and the working solution. Alternately, ozonization may be carried out simultaneously with any other stage of the anthraquinone process in which the working solution is treated, except the catalytic hydrogenation stage. The ozone may be introduced alone or in admixture with other gases, e.g., oxygen, air or nitrogen. The ozonization stage can be carried out at any temperature of from $-10°$ C. to about 100° C.; high temperatures, e.g., above 100° C. are not desirable since rapid decomposition of ozone occurs.

The amount of ozone which is effective in treating the working solution will of course depend upon the amount of degradation products in the working solution that must be converted and the manner in which the ozonization is performed. For example, in a batch type ozonization, an effective amount of ozone can be passed through the batch of working solution by introducing a gas stream containing at least about 0.01 weight percent ozone (about 0.01 to about 3 weight percent ozone can readily be produced by conventional ozonators) and continuing the flow of ozone for from 20 minutes to 10 hours; an excess of ozone is desired to insure a rapid and complete reaction since additional ozone does not deleteriously affect the working solution. Pure ozone can be used if desired. During this ozonization stage the color of the batch of working solution becomes substantially lighter, e.g., from dark brown to a light orange. When the color of treated working solution no longer becomes lighter, the ozonization is normally complete.

In a continuous ozonization stage, the working solution is continuously passed through a treating chamber and a gas stream containing at least 0.01 weight percent ozone is passed through the working solution in the chamber. The working solution may conveniently be a side stream which is removed from a main body of working solution and which is continuously passed through the ozonization stage. The degree of color change of the working solution in this stage will depend upon the degree of ozonization. This ozonization stage, in conjunction with the other succeeding steps of the invention as defined hereinafter, is effective in gradually regenerating the entire body of working solution. The rate of regeneration will be governed by the relative rates at which the ozone and working solution contact each other, as well as the total amount of working solution and impurities which must be treated.

During the ozonization stage the working solution is not regenerated to any substantial extent; that is, the effective total quinone concentration (total weight percent of effective working compound and its tetrahydro derivative) of the working solution is not increased by the ozonization step alone.

Following either ozonization technique, i.e., either batch or continuous treatment, the ozone-treated working solution is passed through the same subsequent treating stages set forth below. If the ozone-treated working solution contains ozonides, these should be removed before proceeding further. A most convenient way of doing this is to introduce hydrogen peroxide (e.g., 20% $H_2O_2$) into the working solution.

Following the ozone stage the working solution is treated with an aqueous alkali metal hydroxide solution at a temperature of from about 25 to about 100° C. The aqueous alkali metal hydroxide solution is made up by dissolving enough of an alkali metal hydroxide such as sodium hydroxide, lithium hydroxide or potassium hydroxide in water until the concentration of the alkali metal hydroxide is from about 5 to about 25 weight percent. The preferred alkali metal hydroxide, for reasons of economy, is sodium hydroxide at concentration levels of about 5–10%. The working solution is then extracted with the above aqueous alkali metal hydroxide solution by intimately contacting the two solutions. If desired, a scrubbing apparatus can be employed in which the solutions are mechanically agitated while contacting each other.

The temperature of the extraction operation is not critical; it can take place at temperatures of from ambient room temperature up to 150° C. However, it is preferred to carry out the caustic extraction at from 50 to 70° C. because phase separation of two liquids is facilitated by higher temperatures. At the end of the extraction stage, the aqueous alkali metal hydroxide solution that separates from the working solution is colored a dark red. The separated working solution becomes clearer and turns a lighter color after extraction.

Upon separation of the aqueous alkaline hydroxide solution, the remaining working solution is then passed in contact with either activated alumina or activated magnesia. The temperature at which the working solution contacts the activated magnesia or activated alumina is not critical and can range from about ambient temperature up to about 1500 C. However, temperatures of from about 50 to 150° C. are preferred, since the regeneration proceeds more rapidly at elevated temperatures.

Any activated alumina or magnesia may be employed in the present invention. The term "activated alumina" as used herein, refers to any alumina obtained from natural or synthetic hydrated alumina whether or not it contains minor proportions of silica or other materials and which is dehydrated by heating so as to convert the alumina to a less hydrated form such as alpha-alumina monohydrate or gamma-alumina monohydrate without going to corundum (which is inactive). Normally, activation can be effected by heating the alumina to temperatures of from 300 to 800° C. in order to convert it to a microporous alumina having an extensive surface area.

The term "activated magnesia" is used to mean substantially anhydrous magnesia prepared by heating various magnesias such as magnesium hydroxide, magnesium carbonate, magnesium nitrate in such a manner as to produce a microporous physical form having an extensive surface area.

It is considered within the scope of the present invention, to remove all or a portion of the working solution which is undergoing cyclic treatment to produce hydrogen peroxide, and to treat the removed working solution continuously so as to maintain its effective, total effective quinone level within specified limits, or to materially reduce the rate of loss of total effective quinone. In this embodiment, a stream is removed from the main body of working solution and continuously treated by ozonization, caustic extraction and activated alumina or magnesia contact, in stages, as described previously. In this continuous treatment, any degradation products formed during cyclic processing are substantially balanced by continuous regeneration to substantially maintain the total effective quinone concentration of the working solution.

In the present invention it is essential that the degraded working solution be first treated to the ozonization and causic extraction stage prior to the treatment with activated alumina or activated magnesia in order to assure obtaining regeneration of a degraded working solution. When all of the above steps are followed, working solutions which cannot be regenerated by simple treatment with activated alumina or activated magnesia alone, or solutions which, after continued use in the anthraquinone process begin to show progressive resistance to regeneration by simple activated alumina or magnesia treatment, can be regenerated to increase their hydrogen peroxide producing capacities.

The exact reason why the present invention is capable of regenerating even seriously degraded anthraquinone working solutions is not known. However, without intending in any way to limit the invention to any theory or mode of operation, the following explanation is given. It is believed that the present ozonization and caustic extraction steps either eliminate, neutralize or render innocuous certain impurities in the working solution that interfere with the regeneration of the working solution with activated alumina or activated magnesia.

More specifically, in a conventional regeneration of a working solution by treatment with activated alumina or activated magnesia, it is believed that two separate reactions occur. In the first reaction the tetrahydro derivative of the working compound is reconverted to the corresponding anthraquinone working compound. Simultaneously, in a second reaction, at least one type of degraded product is converted to the tetrahydro derivative of the anthraquinone (and possibly further to the precursor anthraquinone). This latter reaction must take place if the effective quinone concentration of the working solution is to be increased, which in turn raises the peroxide producing capacity of the solution.

A type of degradation product which undergoes this change is believed to be an epoxide of the tetrahydro derivative; that is, it has an oxygen atom attached to two vicinal carbon atoms of the tetrahydroanthraquinone. Conversion of this epoxide to the tetrahydro derivative of the anthraquinone working compound is believed to take place under normal conditions by simple contact with activated alumina or activated magnesia, provided that no degraded products are present which interfere with the conversion. However, with continual use of the working solution in the anthraquinone process, additional degradation products are formed. These are believed to interfere with the conversion of the epoxide to the corresponding tetrahydro derivative, and that as a result, this conversion reaction takes place to a progressively lesser extent with increasing amounts of these interfering degradation products until finally the activated alumina per se is no longer effective in reconverting the epoxide to the tetrahydro derivative. It is believed that the ozonization and caustic extraction stage removes, neutralizes or renders innocuous these interfering degradation products, and that as a result regeneration of the working solution by conversion of the epoxide to the tetrahydro derivative of the anthraquinone working compound then can take place.

The following examples are given to illustrate the invention and are not deemed to be limiting thereof.

EXAMPLE 1

*Run A—Process of the invention.*—A working solution containing 2-ethylanthraquinone as the working compound was cyclically hydrogenated and oxidized for over 100 cycles. The hydrogenation was achieved in a fixed bed catalyst hydrogenator wherein the catalyst was palladium, carried on dolomite. After completion of well over 100 cycles the working solution had the following composition (expressed as weight percent):

Dimethylnaphthalene _____ 40
Trioctylphosphate _____ 28
Kerosene _____ 18
2-ethylanthraquinone _____ 1.32
2-ethyltetrahydroanthraquinone _____ 6.25
An epoxide derivative of 2-ethyltetrahydroanthraquinone _____ 2.0
Unknown degradation products from solvent and/or working compounds _____ 4.43

A 600 ml. sample of the above degraded working solution was ozonized for three hours at ambient temperatures. The ozone was generated by passing dry oxygen into a Welsbach ozonator, and the resultant mixture of oxygen and ozone was passed through the working solution at a rate of about 1 liter per minute in which the ozone concentration in the gas mixture was about 40 mg./liter. The weight ratio of ozone to the weight of working solution was 1:25. Following this treatment the dark brown color of the working solution had changed to a light orange upon completion of the ozonization. Thereafter, the solution was washed with 75 ml. of 20% hydrogen peroxide to decompose any ozonides which remained. Following this, the working solution was analyzed polarographically; the effective total quinone content (total weight percent of ethylanthraquinone and tetrahydro derivative thereof) remained unchanged.

The working solution, thus treated, was then scrubbed with 500 ml. of 10% sodium hydroxide at between 50 and 70° C., by agitating the two liquids in contact with one another. Upon letting the mixture stand, the aqueous solution separated from the working solution as a separate phase. Following this extraction, the working solution was clearer and a lighter orange color, while the aqueous extract was dark red instead of colorless. The two phases were separated and the working solution was again analyzed polarographically; the effective total quinone content (total weight percent of ethylanthraquinone and tetrahydro derivative thereof) remained unchanged. The working solution, thus treated, was then contacted with activated alumina at a temperature of between 70 and 75° C. by passing the solution through a column one inch in diameter and twelve inches in length containing about 50 g. of activated alumina. The working solution was fed continuously from a feed tank into the top of the column at a rate of 15 cc. per minute and passed through the activated alumina and into a reservoir fitted with a U-tube siphon. Periodically, the reservoir drained into the feed tank before the latter emptied. In this way, substantially batchwise treatment of the entire working solution through the alumina was continued throughout the treating period. Polarographic analyses of the resulting solution were performed periodically. These results are set forth in the following table.

TABLE

| Alumina treatment time (hours) | Tetrahydro [1] content (wt. percent) | 2-EAQ [2] content (wt. percent) | Epoxide content (wt. percent) | Total effective quinone (wt. percent) |
|---|---|---|---|---|
| Starting solution | 6.25 | 1.32 | 2.0 | 7.6 |
| 8.5 | 6.5 | 2.0 | 1.4 | 8.5 |
| 17 | 6.4 | 2.3 | 1.2 | 8.7 |
| 26 | 6.2 | 2.6 | 0.9 | 8.8 |
| 32.5 | 5.9 | 3.0 | 0.6 | 8.9 |
| 40.5 | 5.4 | 4.2 | 0.2 | 9.6 |

[1] Tetrahydro-2-ethylanthraquinone.
[2] 2-ethylanthraquinone.

*Run B—Process of the prior art.*—A 500 cc. sample of the identical working solution used in Run A was passed through an activated alumina column identical to that set forth in Run A containing 50 g. of activated alumina. The solution was passed through at 15 cc. per minute at a temperature of about 70° C. using the same apparatus as in Run A. After 24 hours of passing solution through the activated alumina column, the working solution was analyzed polarographically; the total effective quinone content of the working solution remained substantially unchanged.

EXAMPLE 2

The procedure of Example 1, Run A, was repeated using 50 g. of activated magnesia in place of activated alumina. The results obtained were substantially the same as those set forth in Example 1, Run A.

EXAMPLE 3

A 600 ml. sample of a degraded working solution identical to that used in Example 1, Run A, was passed continuously into an ozonizing chamber at a rate of 1 ml./minute. The ozone was generated by passing dry oxygen into a Welsbach ozonator, and the resultant gaseous mixture of oxygen and ozone was passed through the working solution in the ozonizing chamber at a rate of 1 liter per minute at ambient temperature. The ozone concentration in the above gaseous mixture was 0.01 weight percent. The working solution, after ozonization, was removed at 1 ml./minute from the ozonizing chamber and passed continuously through a column in which was maintained 20% $H_2O_2$ to remove any ozonides. The working solution was next passed at 1 ml./minute through a scrubber in which was maintained 500 ml. of 10% sodium hydroxide at a temperature of between 50 and 70° C. The scrubbed working solution was continuously drawn off from the top of the extractor and passed at 1 ml./minute through the base of a column containing 50 g. of activated alumina. The working solution after contacting the activated alumina at a temperature of 70 to 75° C. was recycled back to the ozonizing chamber at a rate of 1 ml./minute. The working solution was recycled continuously at the above rates for 90 cycles. At the end of this period, the working solution was analyzed polarographically and found to contain a total effective quinone concentration (weight percent of 2-ethylanthraquinone and tetrahydro-2-ethylanthraquinone in the working solution) of 9.5 weight percent compared with 7.6 weight percent at the start of the experiment.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A method for regenerating a degraded anthraquinone working solution containing an anthraquinone compound dissolved in at least one solvent, wherein said anthraquinone working solution contains degradation products produced during the alternate, cyclic hydrogenation and oxidation of said working solution to produce hydrogen peroxide, which comprises contacting the working solution with ozone in an amount sufficient, in combination with the subsequent alkali treatment, to render innocuous interfering degradation products, extracting the ozone-treated working solution with an aqueous alkali metal hydroxide solution having a concentration of from about 5 to about 25% by weight, separating the working solution from said aqueous alkali metal hydroxide solution, contacting the separated working solution with a member selected from the group consisting of activated alumina or activated magnesia at from ambient temperature to 150° C. and recovering a regenerated working solution having increased hydrogen peroxide producing capacity.

2. Process of claim 1 wherein said alkali metal hydroxide is sodium hydroxide.

3. Process of claim 2 wherein the concentration of said sodium hydroxide in said aqueous solution is from about 5 to about 10% by weight.

4. Process of claim 1 wherein said working solution is contacted with activated alumina.

5. Process of claim 1 wherein said working solution is contacted with ozone by passing a gas stream containing at least about 0.01 weight percent of ozone through said working solution.

6. Process of claim 1 wherein the anthraquinone compound is 2-ethylanthraquinone.

7. A method for regenerating a degraded anthraquinone working solution containing an anthraquinone compound dissolved in at least one solvent, wherein said anthraquinone working solution contains degradation products produced during the alternate, cyclic hydrogenation and oxidation of said working solution to produce hydrogen peroxide, which comprises continuously flowing a side stream of said degraded anthraquinone working solution from a main body thereof into an ozone-treating zone, contacting the working solution in said ozone-treating zone continuously with a gas stream containing at least about 0.01 weight percent of ozone, continuously removing working solution from said ozone-treating zone, continuously extracting the ozone-treated working solution with an alkali metal hydroxide solution having a concentration of from about 5 to about 25% by weight, continuously separating the working solution from said aqueous alkali metal hydroxide solution, continuously contacting the separated working solution with a member selected from the group consisting of activated alumina and activated magnesia at from ambient temperature to 150° C. and recycling a regenerated working solution to the main body of working solution.

8. A method for maintaining the hydrogen peroxide producing capacity of an anthraquinone working solution containing an anthraquinone compound dissolved in at least one solvent, wherein the alternate, cyclic hydrogenation and oxidation to produce hydrogen peroxide also produces degradation products, comprising continuously flowing a stream of said working solution from the main body of working solution being cyclically hydrogenated and oxidized into an ozone-treating zone, contacting the working solution in said ozone-treating zone continuously with a gas stream containing at least about 0.01 weight percent of ozone, continuously removing working solution from said ozone-treating zone, continuously extracting the zone-treated working solution with an alkali metal hydroxide solution having a concentration of from about 5 to about 25% by weight, continuously separating the working solution from said aqueous alkali metal hydroxide solution, continuously contacting the separated working solution with a member selected from the group consisting of activated alumina and activated magnesia at from ambient temperature to 150° C. and recycling a regenerated working solution to the main body of working solution in amounts to maintain the hydrogen peroxide producing capacity of the working solution constant.

References Cited

UNITED STATES PATENTS

| 2,158,525 | 5/1939 | Riedl et al. | 23—207 |
| 2,738,875 | 3/1956 | Sprauler et al. | 23—207 |

FOREIGN PATENTS

| 12,274 | 5/1898 | Great Britain. |

OSCAR R. VERTIZ, *Primary Examiner.*

HOKE S. MILLER, *Assistant Examiner.*

U.S. Cl. X.R.

260—369

PO-1050
(5/69)

UNITED STATES PATENT OFFICE
CERTIFICATE OF CORRECTION

Patent No. 3,432,267      Dated March 11, 1969

Inventor(s) Nathan Dean Lee and Nelson Normal Schwartz

It is certified that error appears in the above-identified patent and that said Letters Patent are hereby corrected as shown below:

Column 4, line 26 "1500 C" should be -- 150°C --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents